United States Patent
Wirz

[15] 3,675,917
[45] July 11, 1972

[54] SUCTION HEAD IN SHEET-FEED SYSTEMS

[72] Inventor: Arno Wirz, Schwetzingen, Germany

[73] Assignee: Heidelberger Druckmaschinen Aktiengesellschaft, Heidelberg, Germany

[22] Filed: July 24, 1970

[21] Appl. No.: 58,037

[30] Foreign Application Priority Data

July 26, 1969 Germany.....................P 19 38 041.7

[52] U.S. Cl............................................................271/26
[51] Int. Cl..................................................B65h 3/08
[58] Field of Search................271/26, 27, 30; 30/41.5, 41.6

[56] References Cited

UNITED STATES PATENTS

| | | | |
|---|---|---|---|
| 2,823,916 | 2/1958 | Wickland | 271/30 |
| 3,471,141 | 10/1969 | Ruetschle | 271/26 |
| 2,530,759 | 11/1950 | Collins et al. | 30/41.6 X |
| 2,313,766 | 3/1943 | Pfanstiehl | 206/45.34 X |
| 2,624,204 | 1/1953 | Babst | 271/26 X |
| 2,722,416 | 11/1955 | Backhouse | 271/26 |
| 3,482,833 | 12/1969 | Schleiden | 271/26 |

Primary Examiner—Joseph Wegbreit
Assistant Examiner—Bruce H. Stoner, Jr.
Attorney—Curt M. Avery, Arthur E. Wilfond, Herbert L. Lerner and Daniel J. Tick

[57] ABSTRACT

Sheet-feed system for sheet processing machines having a suction head for forming an overlapped sheet-feed which has separating suckers for raising sheets from a pile thereof that is automatically adjustable to a given level, the separating suckers cooperating with feeder suckers proper for transporting the sheets in a direction to further conveying means of the sheet feed system, includes a housing for the suction head formed of two housing halves having respective dividing surfaces, and a plurality of aligning pins, the housing halves being joinable and threadedly connectable to one another at the dividing surfaces thereof by the aligning pins, the housing halves serving to receive substantially all mountings for driven parts of the suction head and, in joined and threadedly connected condition thereof, being machinable to form all opposing bores therein in accurate alignment.

3 Claims, 3 Drawing Figures

SUCTION HEAD IN SHEET-FEED SYSTEMS

My invention relates to suction head in sheet-feed systems for sheet processing machines which forms an overlapped sheet-feed and includes separating suckers for raising sheets from a pile thereof that is automatically adjustable to a given level, the separating suckers being operable simultaneously as feeder suckers or cooperating with feeder suckers proper for transporting the sheets in a direction to further conveying means of the sheet-feed system.

Suction heads are known wherein the most essential displaced parts are mounted in a bearing block which, in the shaping thereof, is exceptionally complex to machine. The housing walls and other bearing parts are screwed against the bearing block so that the suction head housing is composed of a multiplicity of parts. Furthermore, the housing walls serve also for accommodating several bearing bushings.

The manufacture and assembly of such formed suction head are both complex as well as costly and are therefore not suited for mass production.

It is accordingly an object of my invention to provide suction head in sheet-feed systems wherein the machining of the suction head housing as well as the assembly thereof is greatly facilitated and reduced in cost, while the required precision is considerably increased.

With the foregoing and other objects in view, I provide in accordance with my invention, suction head in sheet-feed systems of the aforementioned type comprising a housing for the suction head formed of two housing halves having respective dividing surfaces, and a plurality of aligning pins, the housing halves being joinable and threadedly connectable to one another at the dividing surfaces thereof by the aligning pins, the housing halves serving to receive substantially all mountings for driven parts of the suction head and, in joined and threadedly connected condition thereof, being machinable to form all opposing bores therein in accurate alignment.

In accordance with further features of the invention, the housing halves are formed either of compressed cast metal or of a suitable plastic material.

Other features which are considered as characteristic for the invention are set forth in the appended claims.

Although the invention is illustrated and described herein as embodied in suction head in sheet-feed systems, it is nevertheless not intended to be limited to the details shown, since various modification and structural changes may be made therein without departing from the spirit of the invention and within the scope and range of equivalents of the claims.

The construction and method of operation of the invention, however, together with additional objects and advantages thereof will be best understood from the following description of specific embodiments, when read in connection with the accompanying drawings, in which.

Figure 1:
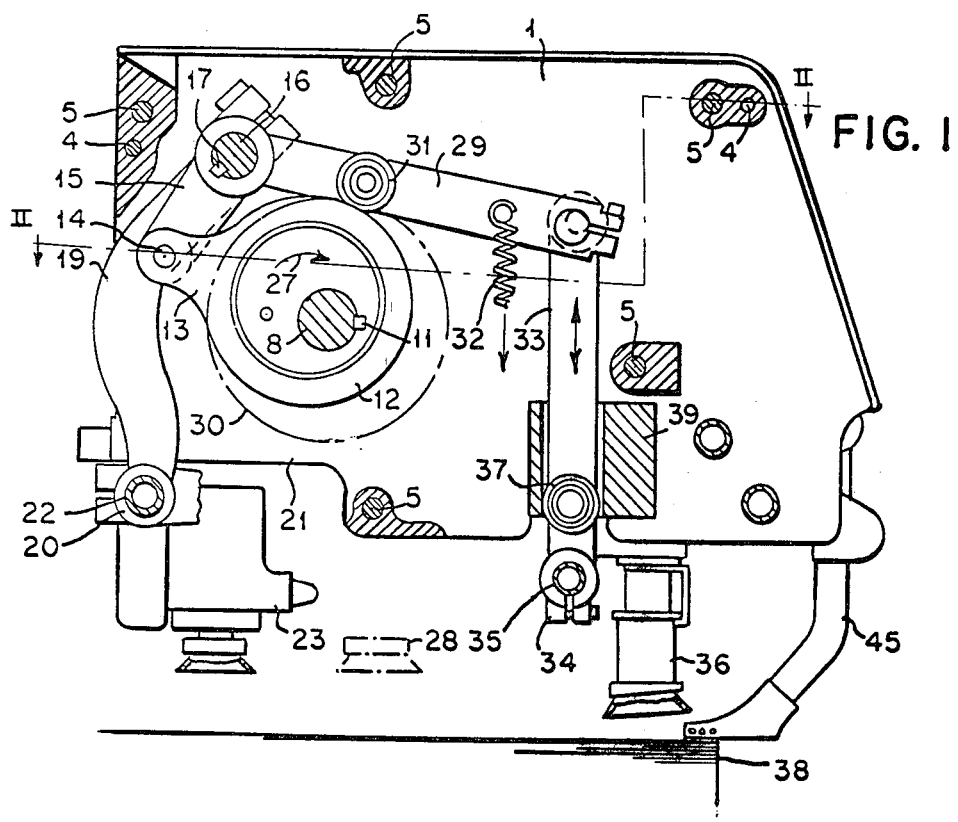
FIG. 1 is a vertical sectional view of the suction head of my invention.

Referring now to the drawings, there is shown therein a suction head constructed in accordance with my invention. Almost all of the drive means for my novel suction head are mounted in a suction head housing 1 formed of two halves 2 and 3, at the dividing surfaces thereof advantageously located in the middle of the housing, that are matchingly fitted together with aligning pins 4 and connected to one another by screws 5. Both of the housing halves 2 and 3 are formed with respective sidewalls 6 in each of which a bearing 7 for a drive shaft 8 is provided. The drive shaft 8 has a free end that projects out of the suction head housing half 3 and is provided with an end flange 9 to which a non-illustrated universal joint shaft of the suction head drive is connectable.

Within the suction head housing, an eccentric 10 is secured by an adjusting spring 11 to the drive shaft 8. A coupling member 12 is mounted with roller or oilless slide bearings on the eccentric 10. The coupling member 12 terminates in an eye 13 which is articulatingly connected by means of a pin 14 with a crank lever 15. The crank lever 15 is fastened by an adjusting spring 17 to a bearing shaft 16. The bearing shaft 16 proper extends parallel to the drive shaft 8 and is mounted, similarly to the latter, in both suction head housing halves 2 and 3 by means of ball bearings 18. Directly adjacent both bearings 18, a respective oscillating lever 19 is fastened to the bearing shaft 16 within the suction head housing 1. The free end 20 of each of the oscillating levers 19 extends out of an opening 21 at the underside of the suction head housing 1, and forms a receiver for a feeder sucker holder 22 which is of tubular construction and is rotatably mounted in the free end 20 of the oscillating lever 19. A respective feeder sucker 23 is suitably mounted on the holder 22 at both sides of the suction head of my invention.

At each side of the suction head there is, moreover, located a guide rod or control lever 24 which is rigidly connected to the holder 22 and which has a free end armed with a roller 25 which runs along a horizontal guideway 26. The guide rod 24 functions cooperatively with the horizontal guideway 26 to maintain the reciprocating feeder sucker 23 always in a horizontal plane. It should also be noted that the roller 25 is formed of an encapsulated anti-friction bearing.

By rotation of the drive shaft 8, in direction of the arrow 27 (FIG. 1), the bearing shaft 16 is twisted or turned through the coupling member 12 and the crank lever 15 and is swung back and forth correspondingly with the oscillating lever 19. Accordingly, the feeder suckers 23 are displaced from the forward, extended position thereof shown in solid lines in FIG. 1 to the rearward position 28 thereof shown in dotted lines and back again.

Figure 2:
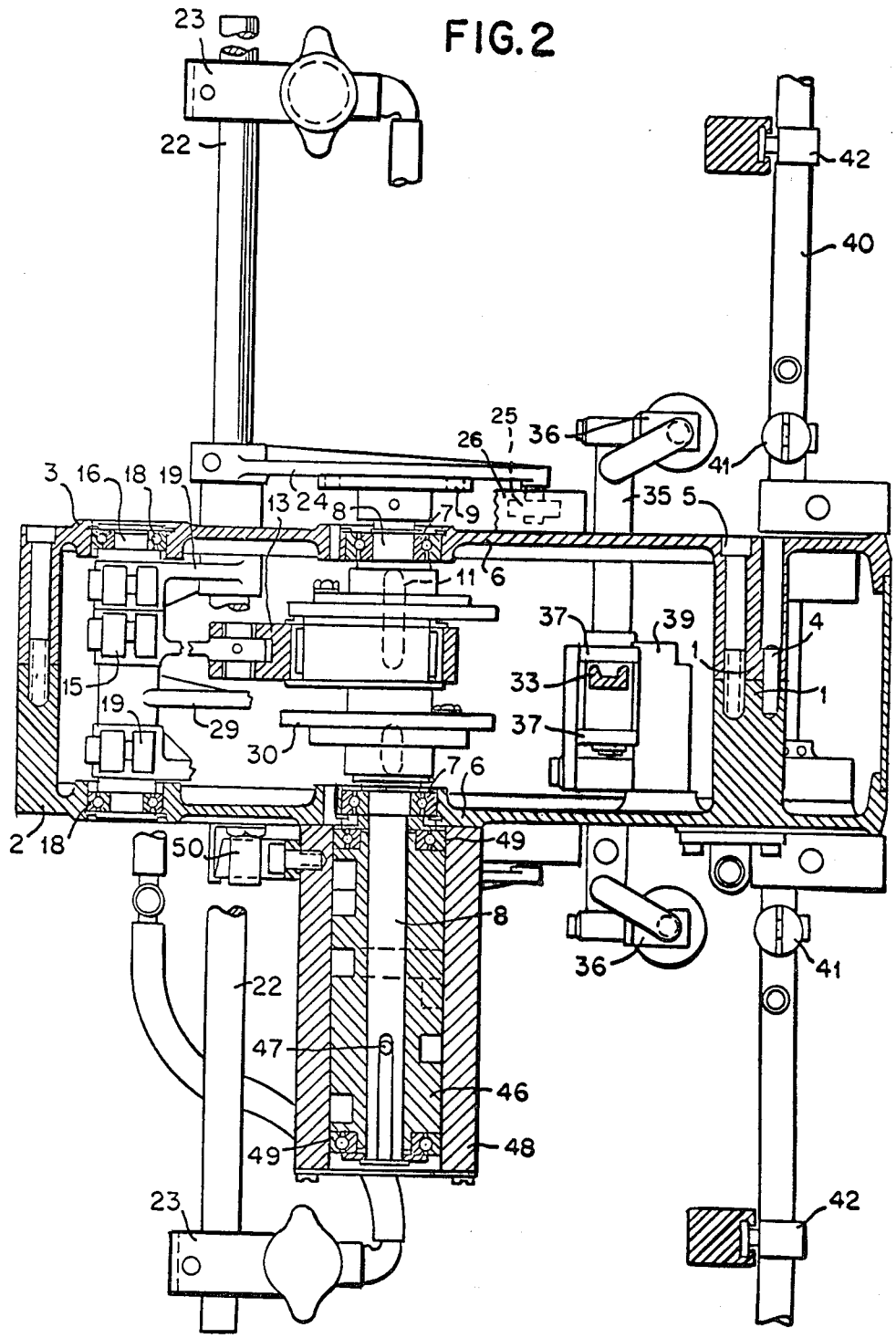
FIG. 2 is a sectional view of FIG. 1 taken approximately along the line II—II.

A roller lever 29 is rotatably mounted on the bearing shaft 16 in addition to and adjacent the oscillating levers 19 and the crank lever 15. It extends above the drive shaft 8 as viewed in FIG. 1 and is reciprocatingly oscillated through a roller 31 by a cam disc 30 fixed to the drive shaft 8. A helical spring 32 continuously biases the roller 31 which is rotatably mounted at the roller lever 29, toward the contact surface of the cam disc 30. At the free end of the roller lever 29, a steering lever 33 is pivotally mounted and has a lower end 34, as viewed in FIG. 1, which projects out of the suction head housing 1 and forms a receiver for a holder 35 of separating suckers 36. At each side of the suction head of my invention, a separating sucker 36 is advantageously clamped firmly to the holder 35 as shown in FIG. 2.

Vertical rectilineal guidance of the steering lever 33 and of the separating suckers 36 therewith, is effected by a guide 39 wherein the steering lever 33 is supported by two support rollers 37, respectively formed of encapsulated, maintenance-free ball bearings. Due to the use of two encapsulated ball bearings as support rollers, lubrication of the slide or rollway of the guide 39 is unnecessary, and the pile 38 of sheets located below the suction head of my invention, is accordingly prevented from being soiled, especially since all other bearing locations are encapsulated and consequently maintenance-free. The separating suckers 36 are firmly clamped onto the tubular holder 35, so that they can be swung in the direction of advancement of the sheets of the pile 38 and in opposite direction thereto. In a conventional manner, a tube 40 is located at the rear end of the suction head of my invention, i.e. the right hand side of FIG. 2. The tube 40 projects from both sides of the suction head and carries loosening blowers 41, and pile stops 42. Furthermore, at the rear end of the suction head of my invention, as viewed in FIG. 1, there is provided a conventional sensing or feeling device 45 which senses or determines the level of the upper edge of the pile 38.

On the drive shaft 8, outside the suction head housing 1 and located toward the end of the shaft 8 opposite from the drive flange 9, a rotary valve 46 positively turnable through an entrainer pin 47 is mounted. This rotary valve 46 is surrounded by a valve housing 48 which is supported by two ball bearings 49 on the rotary valve 46. The coordination of the rotary valve 46 with the eccentric 10 through the entrainer pin 47 and the adjusting spring 11 takes place in such a way that sheet transfer from the separating suckers 36 to the feeder suckers 23 occurs exactly in the rearward position 28 of the feeder suckers.

The valve housing 48 is firmly, yet easily releasably, connected by a snap or spring lock 50 with the suction head housing 1.

Figure 3:
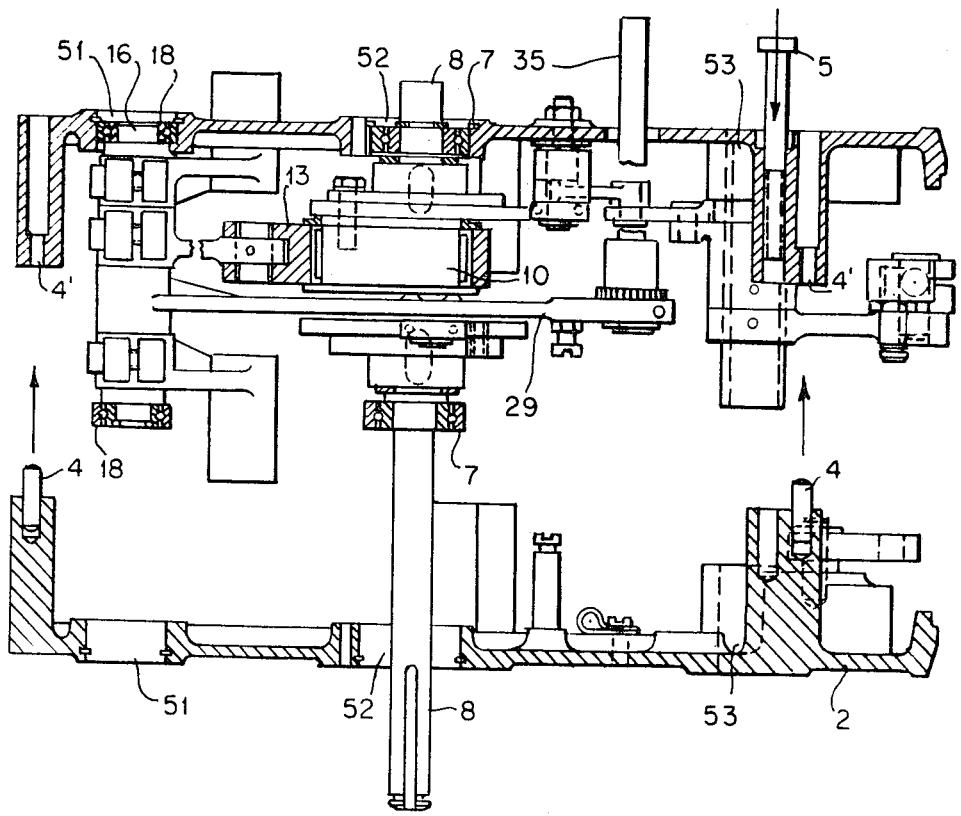
FIG. 3 is another view of FIG. 2 with the housing halves separated from one another and with the suckers and other auxiliary parts omitted in the interest of clarity.

In FIG. 3, the housing halves 2 and 3 are shown shortly before they are joined together. The aligning housing bores 51, 52 and 53 are completely machined in the simplest manner before assembly in the threadedly connected condition of the housing. Accordingly, the machining of many individual parts is dispensed with. The individually pre-assembled structural groups are then inserted in the corresponding housing halves or screwed thereto. Thereafter, the housing halves 2 and 3 are joined together with the aid of the aligning pins 4 as well as with the aligning bores 4' whereby, inter alia, the bearings 7 and 18 of the shafts 8 and 16, respectively, are forced into their respective bores 51 and 52. The screws or bolts 5 then finally bind both housing halves 2 and 3 to one another. Manufacture and assembly prove to be highly simplified. Special additional machining for truing or fitting is dispensed with.

I claim:

1. In a sheet feed system for sheet processing machines, a suction head for forming an overlapped sheet feed having separating suckers for raising sheets from a pile thereof, the separating suckers cooperating with feeder suckers proper for transporting the sheets in a given plane and in a direction to further conveying means of the sheet feed system, the improvement therein comprising a housing for the suction head formed of two elongated housing halves extending longitudinally in the sheet transporting direction and having respective dividing surfaces located substantially in the middle of said housing and extending perpendicularly to the plane in which the sheets are transported, said housing halves having means therein for mounting within said housing halves, respectively, in preassembled condition, parts of drive control and bearing systems of the suction head, said housing halves being alignably joinable and threadedly connectible to form said housing and simultaneously support the parts of the suction head in operating position thereof.

2. Suction head according to claim 1, wherein said housing halves are formed of compressed cast metal.

3. Suction head according to claim 1, wherein said housing halves are formed of plastic material.

* * * * *